(12) United States Patent
Kister et al.

(10) Patent No.: US 8,682,370 B2
(45) Date of Patent: Mar. 25, 2014

(54) RADIO COMMUNICATION SYSTEM AND METHOD FOR COMMUNICATION BETWEEN BASE STATION AND ANTENNA

(75) Inventors: Andreas Kister, Loerrach (DE); Mattias Lampe, Wolfenbuettel (DE)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 13/260,592

(22) PCT Filed: Mar. 27, 2009

(86) PCT No.: PCT/CN2009/071041
§ 371 (c)(1),
(2), (4) Date: Sep. 27, 2011

(87) PCT Pub. No.: WO2010/108330
PCT Pub. Date: Sep. 30, 2010

(65) Prior Publication Data
US 2012/0021790 A1 Jan. 26, 2012

(51) Int. Cl.
*H04B 7/00* (2006.01)
(52) U.S. Cl.
USPC .......... 455/507; 455/550.1; 455/575.5; 455/561; 455/562.1; 455/67.11; 379/433.01; 379/428.01; 343/702
(58) Field of Classification Search
USPC ............ 455/507, 508, 550.1, 575.1, 575.5, 455/67.11, 67.14, 412.1, 412.2, 90.1, 90.3, 455/566, 572, 561, 562.1; 379/433.01, 379/428.01; 343/702
See application file for complete search history.

(56) References Cited

U.S. PATENT DOCUMENTS

2004/0257284 A1* 12/2004 Rada et al. .................. 343/702

FOREIGN PATENT DOCUMENTS

| CN | 1633197 A | 6/2005 |
| CN | 2738503 Y | 11/2005 |
| CN | 101043239 A | 9/2007 |
| CN | 101246998 A | 8/2008 |

* cited by examiner

*Primary Examiner* — Keith Ferguson
(74) *Attorney, Agent, or Firm* — Laurence A. Greenberg; Werner H. Stemer; Ralph E. Locher (57) ABSTRACT

A radio communication system has a base station and one or more antennas, each of the one or more antennas connects with a radio frequency port of the base station through an RF connection. Direct current and/or low frequency (DC/LF) signals are transmitted to an antenna via the RF connection corresponding to the antenna. The radio communication system further has an identification module at the antenna side, adapted to give an indication for identification of the antenna when receiving the DC/LF signals from the RF connection. Accordingly, the information exchange between the base station and a more or less intelligent "identification unit" in the antenna is performed to allow identification of the antenna from the base station side and further allow diagnosis of the cable link.

18 Claims, 5 Drawing Sheets

RADIO COMMUNICATION SYSTEM AND METHOD FOR COMMUNICATION BETWEEN BASE STATION AND ANTENNA

FIELD OF THE INVENTION

This invention relates to wireless communications, and more particularly, to a radio communication system and a communication method between a base station and antennas for identification of the antennas and diagnosis of radio frequency (RF) components.

BACKGROUND OF THE INVENTION

In wireless communication systems, particularly in outdoor scenarios (e.g. cellular communication systems, vehicle-to-wayside data communication, etc.) each radio base station may be equipped with several antennas which might be spatially separated by some distance from the base station hardware. Here, the term base station used throughout this invention generally refers to the transmitting/receiving entities of the stationary radio network infrastructure. That is, the term base station also covers Access Points of WLAN based systems, Radio Gateways of Wireless Sensor Networks, etc.

The antennas will typically be mounted in places that cannot easily be accessed, e.g. on roof tops of buildings, on high masts, etc. Even access to the base station hardware (e.g. for maintenance purposes) may be restricted. For example, in Communication Based Train Control (CBTC) systems, particularly in Mass Transit scenarios, base stations are typically installed close to the track and not accessible during hours of train operation. The possibility of performing certain maintenance tasks remotely or at least reducing the time needed for on-site maintenance activities is therefore quite important for ensuring a reliable operation with acceptable costs and effort.

Figure 1:
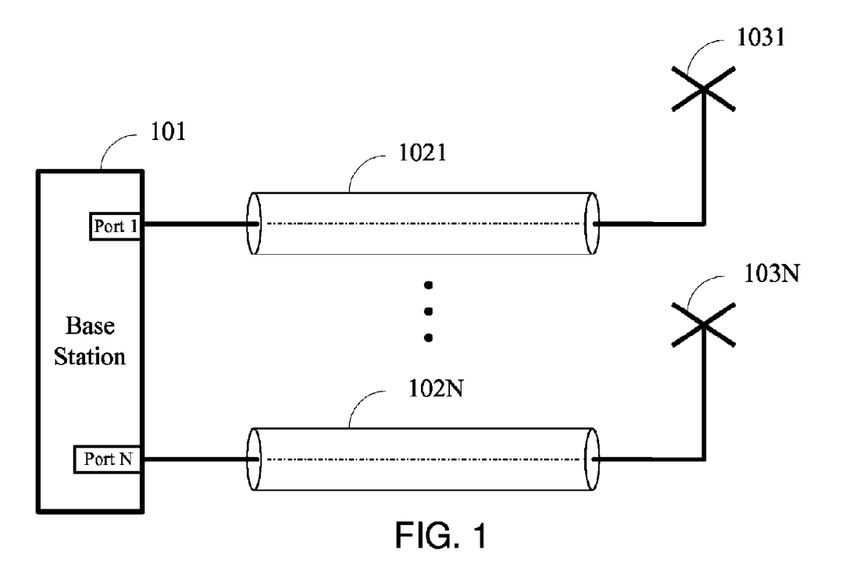
FIG. 1 is a diagram illustrating connections between a base station and antennas in the conventional art.

At each base station location, one or more antennas may be connected. The purpose of connecting more than one antenna to a base station can be redundancy, antenna diversity, combination of multiple antennas to achieve some desired coverage pattern, etc. In the conventional art, connections between a base station 101 and N antennas 1031 to 103N are as shown in FIG. 1. The base station 101 has N ports, i.e., Port 1 to Port N. The antennas 1301 to 103N are connected to corresponding ports of the base station 101, respectively, via RF connections 1021 to 102N. The RF connection can be an RF cable such as a coaxial cable. Furthermore, several base stations serving different communication systems may be co-located, with the corresponding antennas mounted on the same mast or at least close to each other. For example, in a current CBTC project for Guangzhou Line 4 Metro, the train control system alone uses up to 8 antennas per base station. Therefore, identification of antennas may sometimes be complicated.

Regarding the aspect of diagnosis of the RF path, current systems employ a concept of mutual monitoring of multiple radio interfaces. In the system currently installed in Guangzhou Line 4 Metro and Beijing Line 10 Metro, each base station has two independent radio interfaces, and RF propagation conditions between these radio interfaces, i.e. involving radio cards, cabling, antennas and radio channel between the corresponding antennas, are measured and evaluated in order to derive hints about defective or degraded components in the signal path. The scheme has some weaknesses due to the inherent transmission over-the-air and is also limited with respect to the identification of the faulty components, i.e. the localization of problems.

Therefore, in such systems the following practical challenges with respect to routine maintenance tasks arise and have been experienced in actual projects:

1. For reference purposes and post-installation troubleshooting and maintenance, it is desirable to maintain comprehensive documentation of the hardware components (e.g. antennas) used and of their characteristics and performance figures as measured before/during the installation. In principle this documentation could be based on a unique serial number printed on each component or attached to it in an electronically readable form, such as barcode or RFID tag. Since antennas cannot easily be accessed after installation, however, it will be hard to read the attached labels printed on the antennas or attached in an electronically readable form when for example it is required to verify correct assignment of antennas to base stations.

2. In order to guarantee the desired coverage, in multi-antenna systems it is essential that each antenna is connected to the correct RF port of the base station. Since in most cases it is impossible to optically trace back the antenna cable (i.e. RF cable) all the way back to the antenna, there is a large potential for mistakes in the assignment of antenna cables to RF ports of the base station. Careful labelling of the antenna cables at both ends can reduce the probability of mistakes, but labels may easily be torn off accidentally, fade over time, may be hard to read without detaching the cable, etc. Additional error sources come into play during maintenance tasks where for example cable pigtails (including labels) are exchanged.

3. Basic but reliable diagnosis functions for ensuring that the RF connection between base station and antenna is intact would be desirable, e.g. basic checking of the integrity of the cable connection and/or of the attenuation between base station and antenna.

A recent trend in cellular communication systems (e.g. 2G and 3G mobile phone networks) is the separation of the RF processing units from the base stations and their integration into so-called Remote Radio Heads which can be located close to the antenna and relatively far away from the bulky protocol and baseband processing units. The Remote Radio Heads are connected to the base stations typically through optical fibre. The approach is costly, requires highly specialized base station hardware and does not by itself solve the problems stated above. For most applications, the cost and complexity to extend the approach to address the above mentioned issues are prohibitively high.

In view of the above, a better way of supporting communication for maintenance and diagnosis purposes is needed between a base station and antennas, such as providing to the base station information relating to the antennas connected with the base station and/or information relating to RF connections connecting with the antennas.

SUMMARY

Embodiments of the present invention provide a radio communication system and a communication method between a base station and antennas, so as to facilitate such as maintenance and identification of antennas, and/or diagnosis of radio frequency (RF) components.

A radio communication system includes: a base station and one or more antennas, each of the one or more antennas connects with a radio frequency (RF) port of the base station through an RF connection, wherein direct current and/or low frequency (DC/LF) signals are transmitted to an antenna via the RF connection corresponding to the antenna; and an identification module at the antenna side, adapted to give an indication for identification of the antenna when receiving the DC/LF signals from the RF connection.

The identification module is a light emitter or a noise emitter.

The system further includes:

a first filter coupled between the RF port of the base station and a first end of the RF connection, adapted to overlay the DC/LF signals to an RF signal sent from the RF port of the base station, and apply the overlaid signals to the first end of the RF connection; and a second filter coupled between a second end of the RF connection and the antenna, adapted to get the signals from the second end of the RF connection, and extract the RF signal and the DC/LF signals, separately, from the received signals, and provide the DC/LF signals to the identification module for indicating the antenna.

The system further includes: an identification module connected with the second filter, adapted to give an indication when receiving the DC/LF signals from the second filter.

The identification module is a light emitter or a noise emitter.

The system further includes: a first control module connected with the first filter, adapted to provide the DC/LF signals to the first filter.

The system further includes: a switch, adapted to connect and disconnect the first control module from the first filter.

The switch is a mechanical switch or an electronic or electromechanical switch controlled by a CPU or control logic in the base station.

The system further includes: a second control module set at the antenna side, adapted to receive the LF signals from the second filter, and power the identification module according to the LF signals.

The second control module is a microcontroller or programmable logic device.

The first control module is a power & communication module for providing the LF signals to the first filter, powering and performing data communication with the second control module via the LF signals.

The power & communication module is adapted to read ID and application related data of the antenna from the second control module, and/or write data into the second control module.

The system further includes: a user interface, adapted to supervise the operation of the power & communication module and/or display the information read out from the antenna side.

The system further includes: a radio module set at the antenna side, adapted to transform data received from the second control module to RF signals, and transform RF signals received from an RF coupling module into data to be sent to the second control module, wherein the RF signals are coupled to the RF path of the antenna via the RF coupling module; and the second control module is further adapted to perform data communication with the base station via the radio module.

A method for communication between a base station and antennas includes:

overlaying direct current and/or low frequency (DC/LF) signals to an RF signal sent from one of the RF ports of the base station;

applying the overlaid signals to an RF connection corresponding to the RF port; and extracting the DC/LF signal from the signals received from the RF connection to power an identification module set at the antenna side of the antenna corresponding to the RF port for indicating the antenna.

The method further includes:

transforming data stored in a second control module at the antenna side into RF signals;

coupling the RF signals from the second control module into the RF signal path of the base station;

sending the coupled signals via the RF connection to the base station.

The data include any of the following: basic information of the antenna, installation data, technical characteristics of the antenna, test signals generated periodically or on demand for diagnosis of RF components.

The method further includes:

transmitting, by the base station, RF signals containing data to be written to the second control module together with RF signals to be transmitted to the antenna via the RF connection;

splitting the RF signals received from the RF connection, and transforming the RF signals to be written to the second control module to obtain the corresponding data.

Compared to today's typical systems employing mostly passive antennas, embodiments of the present invention set a first filter at the base station side to overlay a DC/LF signal to an RF signal and transmit the overlaid signal to the antenna side, and set a second filter at the antenna side to recover the overlaid signal to obtain the DC/LF signal, thus providing a signaling channel between the base station and the antenna that can be used in various ways for simplifying maintenance tasks, allowing for a more comprehensive documentation and greatly simplifying the detection and analysis of failures or degradation of the RF signal path(s) between the base station and one or more antennas. Especially, in systems with a large number of base stations and possibly multiple antennas per base station, the availability of the system and its base stations are increased. The diagnosis functions can be easily integrated in an overall remote monitoring concept.

Moreover, the ideas can be applied as an add-on to existing systems without major changes to the existing hardware, and the technology for implementing the features described in the embodiments of the invention is readily available at reasonably low cost. Functionality and cost are easily scalable, depending on budget and required functionality.

EMBODIMENTS OF THE INVENTION

To make the objective, technical solution and merits of the present invention clearer, the present invention is described hereinafter with reference to the following embodiments.

Figure 2:
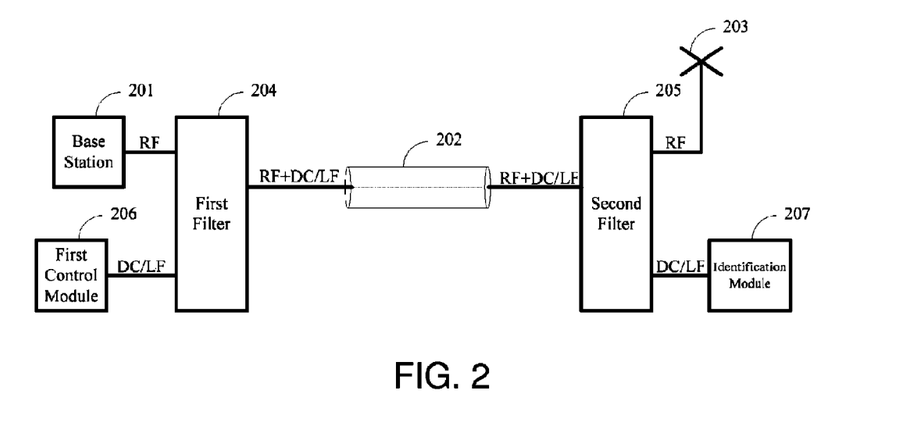
FIG. 2 is a diagram illustrating a structure of a radio communication system for optical antenna identification according to the present invention.

Referring to FIG. 2, embodiments of the invention make use of a technique of coupling direct current (DC) or low frequency (LF) signals into an RF cable in addition to an RF signal from a different source. Specifically, the RF signal provided from an RF port of a base station 201 and the DC/LF signals provided by a first control module 206 are inputted to a first filter 204, wherein the first control module 206 may be a source other than the base station 201. Thereafter, the first filter 204 combines them into a single output signal (i.e., an RF+DC/LF signal) and transmits the RF+DC/LF signal to a second filter 205 through an RF cable 202. Specifically, the first filter 204 connects with a first end of the RF cable 202, and the second filter 205 connects with a second end of the RF cable 202. The first filter 204 applies the RF+DC/LF signal to the first end of the RF cable 202. Subsequently, the RF+DC/LF signal is sent to the second end of the RF cable 202, and then provided to the second filter 205. Then, the second filter 205 recovers the RF signal and the DC/LF signals from the RF+DC/LF signal, and sends the RF signal to the antenna 203 for wireless transmission, and sends the DC/LF signals to an identification module 207. The identification module 207 is adapted to indicate the antenna connected to the RF port when receiving the DC/LF signals from the second filter 205, and may be such as a light emitter, a noise emitter or some moving part. Similar techniques are used, for example, in satellite TV receivers for controlling the behavior (e.g. polarization) of the low-noise block amplifiers (LNBs) of parabolic antennas and for supplying power to active antennas.

The basis commonly used for all embodiments constituting this invention is the availability of a DC and/or low frequency connection between the antenna and the base station. This connection can be most efficiently established using the existing RF connection in combination with a couple of filters. The RF connection could be any kind of RF transmission line, typically a coaxial cable or a waveguide. In real practice, a so-called "bias tee" or other comparable filter structure can be used as the first or second filter shown in FIG. 2.

Figure 3:
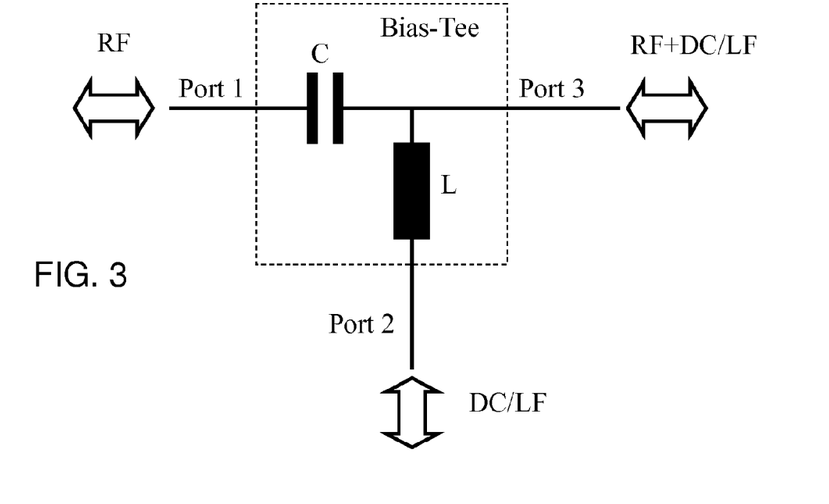
FIG. 3 is an example structure of a bias-tee used in embodiments of the present invention.

The basic structure of a bias tee is depicted in FIG. 3. The bias tee is a kind of multiplexer which has 3 ports arranged in the shape of a T, and is a simple composition of one inductor and one capacitor. The bias tee allows to feed a DC or low frequency current into the RF cable or correspondingly draw the current from the cable without significantly affecting the RF transmission through the cable. This is achieved by a pair of filters, typically an L-C combination at each end of the cable, which separates the DC/LF signals from the RF signals.

Figure 4:
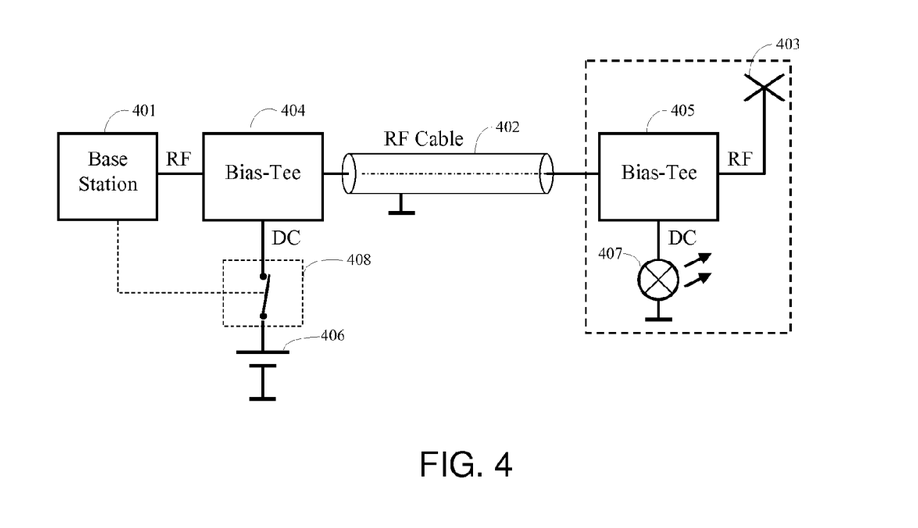
FIG. 4 is a diagram illustrating a structure of a radio communication system for optical antenna identification according to an embodiment of the present invention.

An embodiment of the radio communication system is depicted in FIG. 4 to simplify antenna identification, in particular identification of the antenna connected to the far end of a particular antenna cable. The system includes a DC power supply 406 and some kind of switch mechanism 408 at the base station side and a light emitter 407 attached to the antenna 403 and powered through the RF cable 402 by the aforementioned DC power supply 406. The switch 408 can be a mechanical switch, some type of electronic or electromechanical switch controlled by a CPU or other control logic in the base station 401. It is possible to switch the DC power supply 406 to the antenna side unit (e.g. the light emitter) on and off on demand, preferably controlled by some software in the base station. By powering the antenna side unit only when it is really needed, the life time of the unit can be increased and the probability of failure can be reduced. Typically, diagnostics are needed only in relatively large intervals, such as once or twice per day. In some use cases the switch 408 may be omitted and the DC port of the bias tee 404 at the base station side is manually connected to and disconnected from the DC power supply 406 directly.

Figure 5:
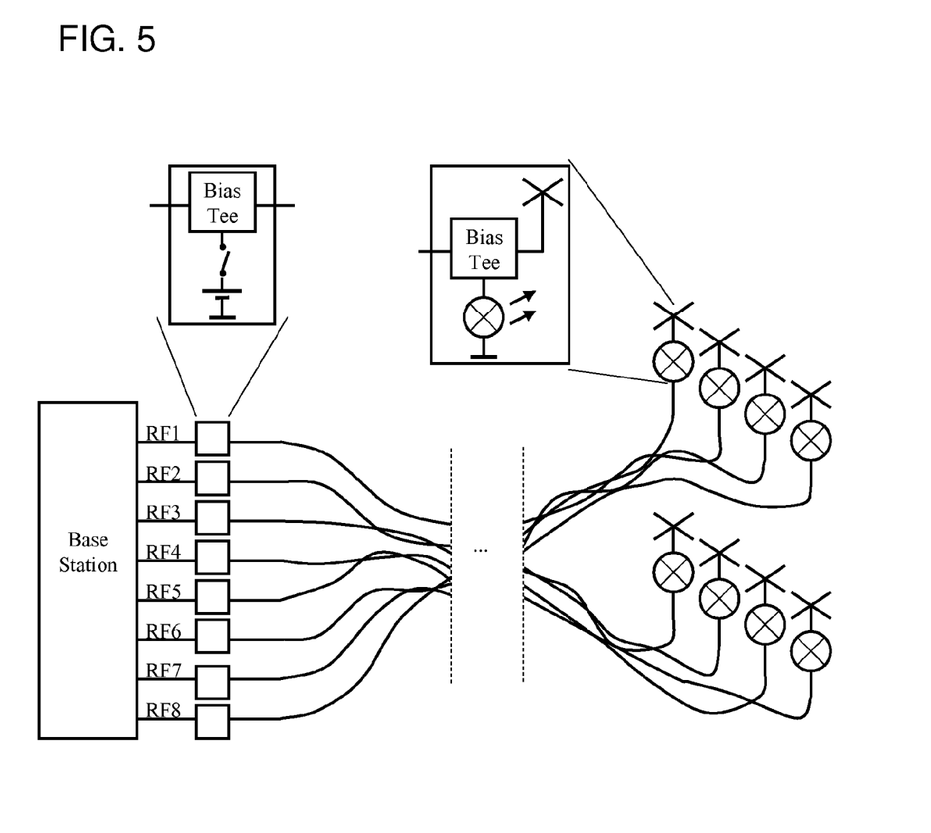
FIG. 5 is an application scenario for optical antenna identification according to an embodiment of the present invention.

FIG. 5 is a possible use case for the radio communication system shown in FIG. 4. Assume a base station that is connected to a set of N antennas, where each antenna, according to its pattern and orientation, needs to be connected to a particular RF port of the base station. In most cases, it will be impossible to optically trace back the cables from the base station to the connected antennas. Assume that during some maintenance task the antenna cables have been disconnected from the base station and need to be reconnected in the correct way. By attaching the power supply to the open end of an antenna cable via a bias-tee, the antenna at the far end can easily be identified, as the integrated light emitter lights up.

Figure 6:
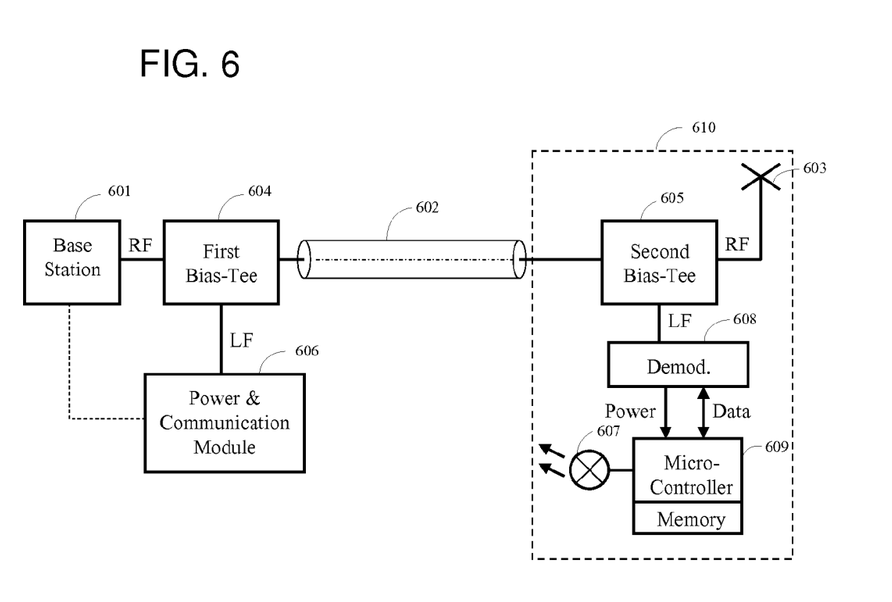
FIG. 6 is a diagram illustrating a structure of a radio communication system for antenna identification and RF diagnosis by integration of a microcontroller to the antenna side according to another embodiment of the present invention.

FIG. 6 shows the hardware architecture of another embodiment for extending the functionality described in FIG. 4 by including a second control module such as a microcontroller or programmable logic device (e.g. CPLD, FPGA) at the antenna side. In the following it is assumed that a microcontroller 609 together with a memory is used as the second control module. Specifically, the base station side of the system includes a base station 601, a power & communication module 606 for providing low-frequency alternating current (AC) power and performing data communication with the microcontroller 609 through the RF cable 602, a first bias-tee for adding an LF signal input by the power & communication module 606 to an RF signal input by the base station 601. As to the power & communication module 606, power supply is one of its functions, and another function is data communication. Preferably, the operation of the power & communication module 606 can be controlled by the base station 601. The antenna side 610 of the system includes an antenna 603 for receiving the RF signal from and/or transmitting the RF signal to the outside (such as to client devices) from an air interface, a second bias-tee 605, a light emitter 607, a demodulation module 608 and the microcontroller 609. The microcontroller 609 will be powered through the RF cable 602 as described before. Additionally, the microcontroller 609 will be able to communicate with an entity at the base station side, such as the power & communication module 606, using a suitable form of low frequency signalling. Methods for using the same band-limited electrical connection, for example the DC/LF path on the RF cable, for power supply and data communication simultaneously are state-of-the-art and used in many applications, e.g. digital control of model railway trains, "iButton" digital identification devices, etc. The microcontroller 609 will store a unique ID and possibly some additional application related data in internal or external non-volatile memory.

The base station side can read the ID and application related data remotely either by a separate reader equipment or by some entity (e.g. CPU board) within the base station itself. Examples for the abovementioned application related data include (but are not limited to):

1. basic information of the antenna, such as manufacturer, production date, type, number of the antenna
2. installation data, e.g. installation company, installation date 3. technical characteristics of the antenna, e.g. gain, pattern, impedance, voltage standing wave ratio (VSWR) measured and/or according to manufacturers specifications If the additional option of writing data from the base station side into the antenna is considered, it will be possible to keep a "history file" in the antenna containing information about which base stations the antenna has been connected to in the past. In combination with additional peripherals or integrated features of the microcontrollers in the antennas, it will be possible to store, for example, sensor data about operating conditions of the antenna, data about the alignment or direction of the antenna, and statistics about the RF power transmitted/received through the antenna.

Figure 7:
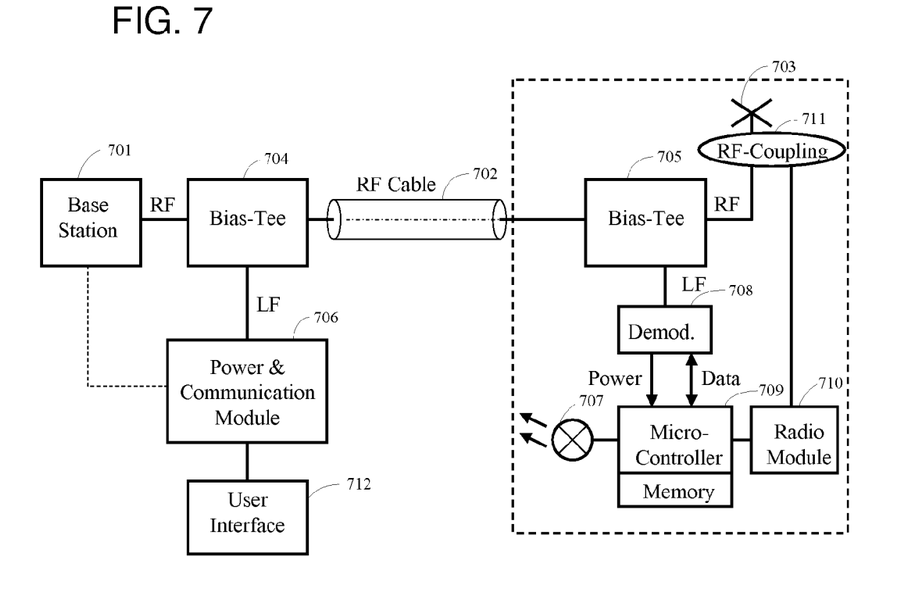
FIG. 7 is a diagram illustrating a structure of a radio communication system for antenna identification and RF diagnosis with simple radio modules integrated into the antennas side according to yet another embodiment of the present invention.

FIG. 7 depicts yet another radio communication system that adds basic RF measurement functionalities to the features described above.

The microcontroller 709 at the antenna side is extended by a radio interface, preferably based on the same standard as the base station itself. In real practice, the radio interface is realized by coupling a radio module 710 connected with the microcontroller 709 to the antenna 703. In WLAN based systems, for example, where the base stations operate according to one of the 802.11 standards, the radio interface at the antenna side can consist of an inexpensive 802.11a, 802.11b, and/or 802.11g module. The antenna's radio module 710 can be directly (i.e. galvanically) coupled to the RF path of the antenna 703 and RF cable 702, respectively, by a power splitter/combiner or similar RF component. The RF path of the antenna is used for communication between the base station and clients via the antenna, and it gets an additional use for data communication between the base station side and the antenna side in this embodiment. Or, the antenna's radio module 710 can be coupled to the antenna 703 indirectly by the electromagnetic field of the antenna and a suitable coupling element (e.g. dipole) at the radio module 710.

In railway communications, the base station 701 will typically include a CPU board with additional radio modules which can be accessed remotely through a wired network (such as the Ethernet). It is therefore possible with very little additional hardware effort to have the base station's CPU board handle the reading of antenna IDs and make the information about the assignment of antenna ports to antenna IDs available system-wide through the backbone network. Since communication with the microcontroller 709 could be done completely through the RF link by the base station 701 itself, the communication function realized by means of LF signalling in the power & communication module 706 becomes optional. That is, in addition to or as a replacement for the communication with the base station side using LF signalling, the microcontroller 709 can thus communicate with the base station 701 in the RF domain, i.e. in the same way that client devices communicate with the base station. When the base station just wants to check the antenna but is currently not communicating with any client, there won't be a signal transmitted to a client. However, the "channel" (i.e. the RF cable) and the communication method may be the same as if communicating with a client, i.e. from the base station's point of view, the antenna may just "look like a client".

The procedure of performing data communication between base station and antenna sides in the RF domain is as follows.

The base station 701 transmits an RF signal containing data to be written to the microcontroller 709 via the RF cable 702 to an RF coupling module 711. The RF signal containing data to be written to the microcontroller 709 is provided to the radio module 710 connected with the microcontroller 709, and finally the data are written into the microcontroller 709. Optionally, the RF signal containing data to be written to the microcontroller 709 may be transmitted via the RF cable 702 together with an RF signal to be transmitted to clients.

Data stored in the microcontroller 709 can be read out and changed into an RF signal by the radio module 710, and the RF signal is coupled to the RF path used for communication between the base station and clients by using the RF coupling module 711 and sent to the base station 701 via the RF cable 702. There are basically two methods to couple the RF signal into the RF path: directly into the RF cable by a power splitter/combiner or similar component, which is in most cases some form of galvanic coupling; or indirectly through the antenna by means of a suitable coupling element (e.g. dipole) connected to the radio module 710 at the antenna side.

The scheme of FIG. 7 that introduces the radio module 710 at the antenna side has several advantages:

1. It can reduce the hardware complexity at the base station side. While communication through LF signalling requires additional hardware at the base station, the radio module allows communication between base station and antenna side using the existing RF interface of the base station. Only the power supply must be provided on the base station side, which is quite independent of the overall base station hardware and does not require any changes to the interfaces of the base station itself 2. In addition to the simple DC based cable integrity checks, the RF link between the antenna and the base station allows a number of RF tests to be executed in order to check the integrity of the RF chain. Such checks include but are not limited to:

(1) mutual signal strength measurement of the antenna and base station sides. The checks are as follows: the unit at the antenna side may periodically or on demand send test signals that are picked up and evaluated by the base station. Additionally or alternatively, the unit at the antenna side may evaluate the signal strength of signals sent out by the base station. Degradation of the RF components (such as cables, connectors, etc.) in the signal path can be detected by evaluation of the signal strength statistics.

(2) measuring signal strength of signals originating from other stations. To reliably detect and classify also degradation of the RF front ends of the radio modules (both at the antenna and base station side), signal strength of signals originating from other stations may be measured by the antenna unit and the base station and the measured values will then be compared. This test is particularly useful to distinguish degradation of cables/connectors from defects of the antenna side radio module.

In addition to the functionality described in FIG. 7, other potentially useful features for such a system include: communication between the antenna side unit and an external device (i.e. not the base station) through the air interface. In case of a broken-down RF connection between base station and antenna, this may provide an additional means for debugging and troubleshooting, e.g. by ruling out defects of the antenna side radio module and by checking whether the antenna side unit can still receive signals from the base station.

It should be pointed out that the user interface 712 shown in FIG. 7 is used for, such as, supervising the operation of the power & communication module 706 and/or displaying the information read out from the antenna side. The user interface 712 is optional and can be replaced by some software in the base station 701.

To give a rough idea of the hardware cost in FIG. 7, bias-tees 704 and 705 functioned as the first filter and the second filter can be bought as high-precision off-the-shelf components for a few tens of Euros at present, including metal housing and coaxial connectors. By integration with the other system components, the cost for the technically very simple bias tees can probably be dropped to a level below 1 Euro per unit. For the antenna side unit, simple 8-bit-microcontrollers 709 are a suitable choice. The cost is in the range of a few Euros, even in small quantities. The radio modules 710 of the antenna side unit, for a WLAN based system, could be based on low-cost chip sets such as the ones currently used in USB WLAN adapters. Such adapters can be bought for approx. 10 Euro, including software and packaging. The price for the chip sets may be assumed to be lower. That is, the architecture provided in the embodiment of the present invention for data communication between base station and antenna and/or antenna identification is of low cost.

By using the systems described above, a method for communication between a base station and an antenna for verification of correct antenna assignment is provided, including: overlaying a direct current and/or low frequency (DC/LF) signal to an RF signal sent from one of the RF ports of the base station, applying the overlaid signals to an RF connection corresponding to the RF port, extracting the DC/LF signal from the signals received from the RF connection to power an identification module set at the antenna side of the antenna corresponding to the RF port. Here, the DC/LF signal is provided by a first control module, and the first control module can be connected while the RF cable is still connected to the RF port of the base station.

Further, a method for checking the integrity of the RF cabling is illustrated. Assuming that the electrical characteristics of the light source and/or possibly some other additional or alternative electrical components at the antenna side are known, significant deviations of the values measured at the base station side from these known characteristic values indicate a faulty RF cable or faulty connectors. For example, the light source attached to the antenna may be a Light Emitting Diode (LED) in combination with a current limiting resistor. Measuring the forward and reverse resistance from the base station side will reveal interruptions as well as short circuits in the cable. It can be seen that although the RF properties of the cabling cannot be tested by this very simple method, some defects in the cables and connectors can be detected by measuring the DC/LF resistance at the bias tee at the base station side.

To sum up, the invention includes a set of technical solutions which can be combined in multiple ways and in combination provide all or a subset of the following features:

1. Unique identification of an antenna by an unambiguous code. The unambiguous code could be a serial number or some other unique identifier. Or, the unambiguous code maybe some number that is related to the position and installation date of the antenna, whatever the user or the manufacturer, system integrator, etc. The unambiguous code can be read out by the base station from the antenna side. Therefore, the identifier can be determined without detaching the antenna from the system and without having direct access to the antenna.

2. Optical identification of the antenna (out of a co-located set) that is connected to a particular RF port of the base station.

3. Logging of usage statistics (e.g. total hours of operation, connection time to particular RF ports etc.) within the antennas.

4. Basic integrity check of the RF path, wherein the RF path includes RF cables and RF front-end.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

The invention claimed is:

1. A radio communication system, comprising:
   a RF connection;
   a base station having a radio frequency port;
   at least one antenna coupled with said radio frequency port of said base station through said RF connection, wherein direct current and/or low frequency (DC/LF) signals are transmitted to said antenna via said RF connection; and
   an identification module adapted to give an indication for identification of said antenna when receiving the DC/LF signals from said RF connection.

2. The system according to claim 1, wherein said identification module is selected from the group consisting of a light emitter and a noise emitter.

3. The system according to claim 2, further comprising:
   a first filter coupled between said RF port of said base station and a first end of said RF connection, said first filter adapted to overlay the DC/LF signals to an RF signal sent from said RF port of said base station and apply overlaid signals to said first end of said RF connection; and
   a second filter coupled between a second end of said RF connection and said antenna, said second filter adapted to get received signals from said second end of said RF connection, extracts the RF signal and the DC/LF signals, separately, from the received signals, and provides the DC/LF signals to said identification module for indicating said antenna.

4. The system according to claim 3, further comprising a first control module connected with said first filter and adapted to provide the DC/LF signals to said first filter.

5. The system according to claim 4, further comprising a switch, adapted to connect and disconnect said first control module from said first filter.

6. The system according to claim 5, wherein:
   said base station has a controller selected from the group consisting of a CPU and a control logic; and
   said switch is selected from the group consisting of mechanical switches, electronic switches and electromechanical switches controlled by said CPU or said control logic in said base station.

7. The system according to claim 4, further comprising a second control module disposed at an antenna side, adapted to receive the LF signals from said second filter, and powers said identification module according to the LF signals.

8. The system according to claim 7, wherein said second control module is selected from the group consisting of a microcontroller and a programmable logic device.

9. The system according to claim 7, wherein said first control module is a power & communication module for providing the LF signals to said first filter, for powering and for performing data communication with said second control module via the LF signals.

10. The system according to claim 9, wherein the data includes at least one of basic information of said antenna, installation data, technical characteristics of said antenna, and test signals generated periodically or on demand for diagnosis of RF components.

11. The system according to claim 9, wherein said power & communication module is adapted to read ID and application related data of said antenna from said second control module, and/or write data into said second control module.

12. The system according to claim 9, further comprising a user interface adapted to supervise an operation of said power & communication module and/or display information read out from the antenna side.

13. The system according to claim 7, further comprising:
a RF coupling module; and
a radio module disposed at said antenna side, adapted to transform data received from said second control module to RF signals, and transform the RF signals received from said RF coupling module into data to be sent to said second control module, wherein the RF signals are coupled to an RF path of said antenna via said RF coupling module, and said second control module is further adapted to perform data communications with said base station via said radio module.

14. The system according to claim 3, wherein said first filter and said second filter are bias tees with three ports.

15. A method for communicating between a base station and antennas, which comprises the steps of:
overlaying direct current and/or low frequency (DC/LF) signals to an RF signal sent from an RF port of the base station;
applying overlaid signals to an RF connection corresponding to the RF port; and
extracting the DC/LF signal from signals received from the RF connection to power an identification module disposed on an antenna side of the antenna corresponding to the RF port for indicating the antenna.

16. The method according to claim 15, which further comprises:
transforming data stored in a second control module at the antenna side into RF signals;
coupling the RF signals from the second control module to an RF path of the antenna; and
sending coupled signals via the RF connection to the base station.

17. The method according to claim 16, wherein the data is selected from the group consisting of basic information of the antenna, installation data, technical characteristics of the antenna, and test signals generated periodically or on demand for diagnosis of RF components.

18. The method according to claim 15, which further comprises:
transmitting, by the base station, RF signals containing data to be written to the second control module together with RF signals to be transmitted to the antenna via the RF connection; and
splitting the RF signals received from the RF connection, and transforming the RF signals to be written to the second control module to obtain the corresponding data.

* * * * *